United States Patent [19]

Hlinsky et al.

[11] Patent Number: 4,626,155
[45] Date of Patent: Dec. 2, 1986

[54] AUTOMATIC CONTAINER SECUREMENT DEVICE WITH A SPRING BIASED, CAM SURFACED HEAD

[75] Inventors: Emil J. Hlinsky, Oak Brook; Stephen W. Simek, Buffalo Grove, both of Ill.

[73] Assignee: MacLean-Fogg Company, Mundelein, Ill.

[21] Appl. No.: 818,500

[22] Filed: Jan. 13, 1986

[51] Int. Cl.$^4$ .................. B60P 1/64; B63B 25/00; F16B 21/08; B65G 57/03
[52] U.S. Cl. ........................ 410/82; 410/69; 410/91; 206/821; 114/75; 403/348; 312/111; 220/1.5
[58] Field of Search .................. 410/73, 76–79, 410/82, 84, 90, 91, 70, 69; 206/509, 511, 512, 821; 114/72, 75; 292/78; 403/348, 349, 323, 316, 405.1, 407.1, 409.1; 248/503, 503.1; 312/111, 250; 244/131, 132; 24/656; 220/1.5

[56] References Cited

U.S. PATENT DOCUMENTS

| | | | |
|---|---|---|---|
| 3,578,374 | 5/1971 | Glassmeyer | 410/79 X |
| 3,820,474 | 6/1974 | Backteman et al. | 410/82 |
| 4,026,596 | 5/1977 | Carr | 410/82 |
| 4,382,734 | 5/1983 | Synowiec et al. | 410/70 |
| 4,564,984 | 1/1986 | Takaguchi | 410/82 X |

OTHER PUBLICATIONS

George Blair & Co. (Sales) Ltd., Information Sheet No. 29, entitled "Blair Twistlock PD151 Mark 2".

*Primary Examiner*—Robert B. Reeves
*Assistant Examiner*—Scott H. Werny
*Attorney, Agent, or Firm*—Mason, Kolehmainen, Rathburn & Wyss

[57] ABSTRACT

A device for automatically securing a cargo container to a support such as a deck of a vehicle or a second container with which the first container is to be stacked. The device includes a base having a projecting shear block received in the locking opening of the container. A head rotates between an unlocked or loading position in which the head moves through the locking opening and a locked position in which the container is secured. Automatic entry and release are provided by a spring within the base biasing the head to the locked position but permitting movement to the unlocked position when torque is applied by engagement of the container with a cam surface on the head. Visible indication of the locked position and positive locking of the head in the locked position may be provided. For stacked containers, two aligned shear blocks and two angularly offset heads are provided and the spring may be released for manual locking of the device to one container followed by automatic locking to the second container.

22 Claims, 14 Drawing Figures

AUTOMATIC CONTAINER SECUREMENT DEVICE WITH A SPRING BIASED, CAM SURFACED HEAD

The present invention relates to container securement devices and more particularly to improvements in cargo container securement devices providing automatic securement and release of a cargo container.

Containerized lading is becoming increasingly popular due to advantages such as labor savings resulting from decreased cargo handling. Modular or standardized containers may be shipped from point to point using a variety of different carriers including rail cars, trucks and ships. Such cargo containers are conventionally provided with corner castings including locking openings used in securing the containers to the various types of vehicles upon which they are loaded.

One type of container securement device used in the past is a container pedestal including a base portion upon which a corner of the container rests, as well as vertically extending walls within which a corner of the container is captured. A latch pivotable about a horizontal axis engages a locking opening in a vertical wall of the container for holding the container down against the base while permitting automatic entry and release of the container. One example of such a container pedestal is disclosed in U.S. Pat. No. 4,382,734.

Another securement device used in the past with cargo containers is a twistlock. This device includes a base upon which the container may rest together with a shear block engageable with a locking opening in the bottom, horizontal wall of the container corner casting. A locking head is manually moved from a released position in alignment with the shear block to a locked position in which the container cannot be lifted away from the base. The head is rotated manually between the locked and the unlocked positions, and automatic entry and release of the container is not possible.

The primary use of container pedestals has been on rail cars where containers are typically loaded and unloaded with a crane and automatic entry and release are important. On the other hand, twistlocks have primarily been used to secure containers to trucks where their small size and light weight is an advantage.

In some instances it is desirable to transport cargo containers vertically stacked upon one another. For example, this type of shipment is finding increasing use in rail cars. Known container pedestals, twistlocks and the like are not well adapted for the securement of stacked container shipments.

Among the objects of the present invention are to provide a cargo securement device providing the advantages of both a pedestal latch and a twistlock; to provide a device achieving automatic cargo container entry and release without the size, weight and expense of container pedestals; to provide cargo securement devices useful both for securing a container directly to a support surface of a vehicle and for securing stacked containers to one another; to provide a cargo securement device including a visible indication of the locked condition; to provide a container cargo securement device providing automatic entry and release without projecting horizontally beyond the container; to provide a cargo securement device capable of automatic entry and release and also including a positive locking feature; and to provide a cargo securement device overcoming disadvantages of those used in the past.

In brief, the above and other objects and advantages of the present invention are achieved by providing a cargo container securement device for securing a cargo container to a support surface. The support surface may be associated with a vehicle such as a rail car, truck or ship, or, in the case of stacked containers may be the surface of an adjacent container.

A cargo container securement device in accordance with the invention includes a housing or base adapted to be fixed to the support surface. A shaft is rotatable around an axis extending through the housing and a cam head is carried by the shaft and is adapted to move through the cargo container locking opening. The cam head has a shape permitting it to move through the locking opening when the cam head is in a first rotational position. When the cam head is in a second angularly offset position, it cannot move through the opening and serves to secure the container against the housing or base. A spring is connected between the shaft and the housing to resiliently bias the cam head to the second position while permitting rotation to the first position in response to the application of torque. A cam surface on the cam head is engageable with the locking opening to apply torque to the cam head as the cam head moves through the locking opening of the cargo container.

The present invention together with the above and other objects and advantages may be best understood from the following detailed description of the embodiments of the invention illustrated in the drawings wherein.

Figure 1:
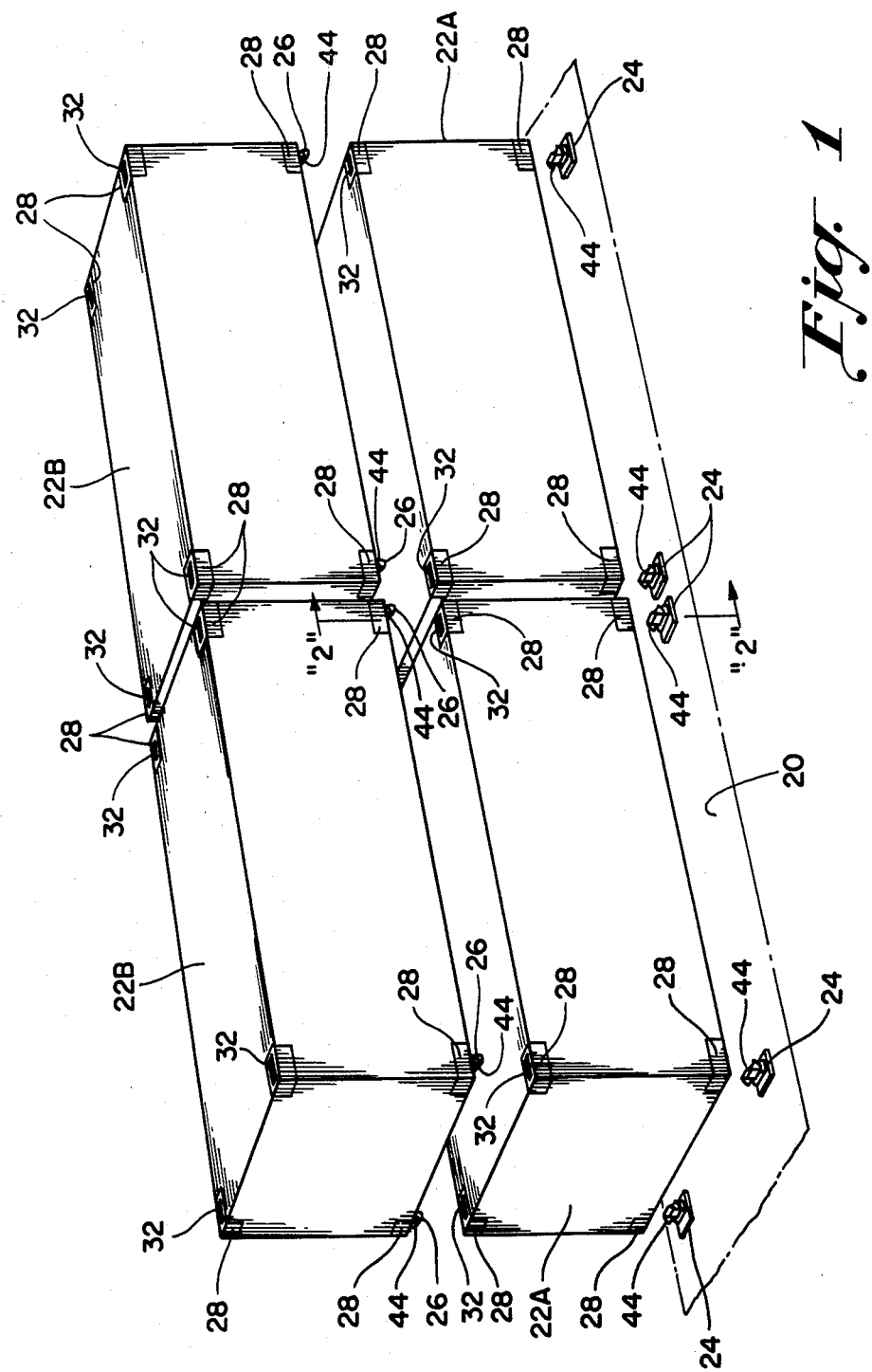
FIG. 1 is a partly schematic perspective view of a support surface and a number of cargo containers to be supported in stacked relation by container securement devices of the present invention.
Figure 2:
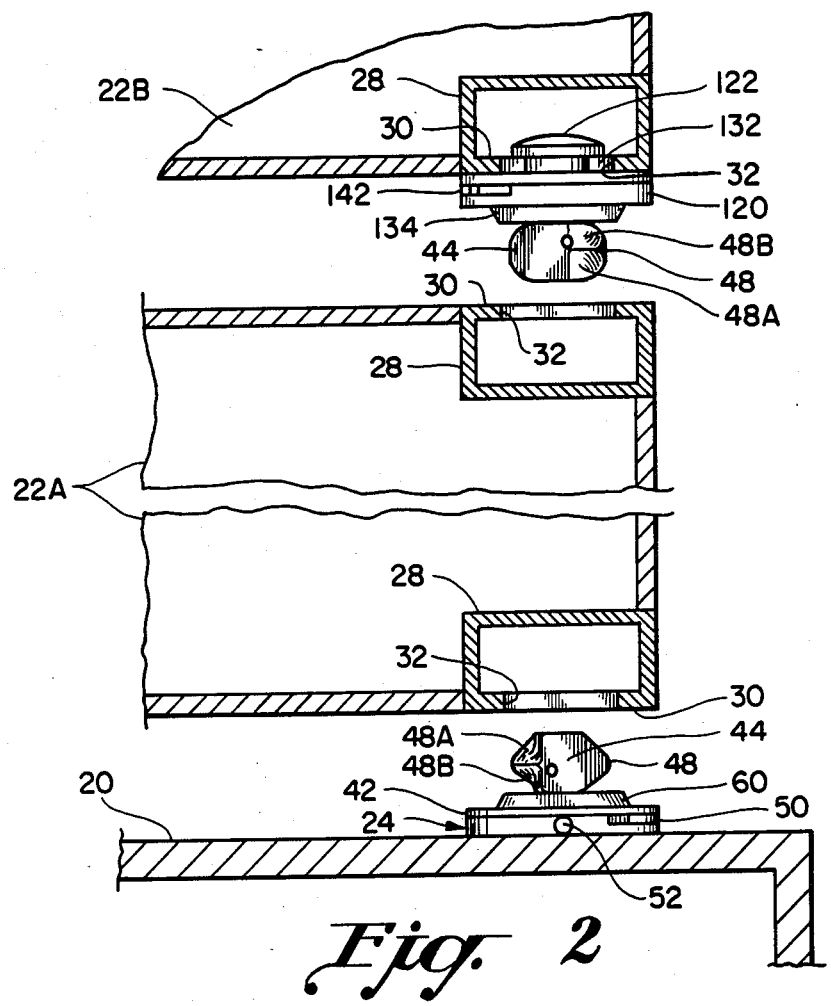
FIG. 2 is a fragmentary, vertical sectional view taken generally along the line 2—2 of FIG. 1 illustrating portions of a pair of containers and container securement devices constructed in accordance with the present invention.
Figure 3:
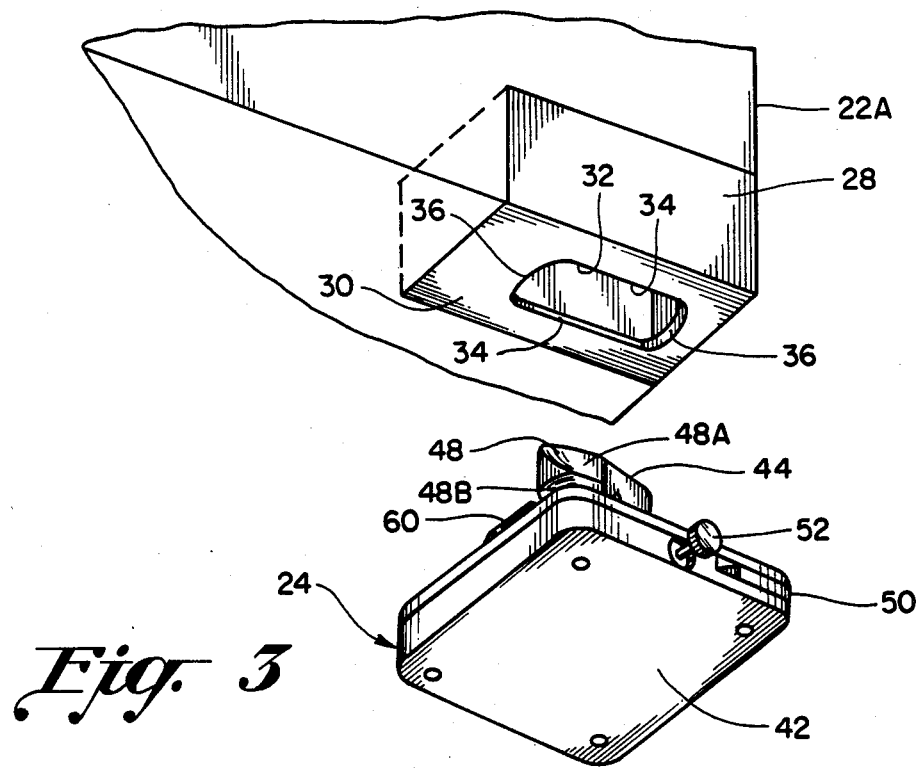
FIG. 3 is a fragmentary perspective view of a portion of one container and one of the container securement devices of FIGS. 1 and 2.

Having reference now to the drawings, in FIGS. 1 and 2 there is illustrated in somewhat schematic form a support 20 upon which lower and upper cargo containers 22A and 22B are to be secured by securement devices 24 and 26 constructed in accordance with the principles of the present invention. Support 20 may, for example, be the deck or floor of a rail car or other transport vehicle. When each lower container 22A is lowered onto support 20, the securement devices 24 automatically secure the containers 22 in place. When the upper containers 22B are lowered in stacked relation onto the lower containers 22A, the securement devices 26 automatically secure the containers 22B to the containers 22A.

The principles of the present invention are applicable to devices for securing various types of containers to various types of supports. In the illustrated embodiments of the invention, the containers 22A and 22B are of a standard and modular type. Each of the eight corners of each container 22A and 22B includes a corner casting 28 having an upwardly or downwardly facing horizontal wall 30 in which is located a noncircular locking opening 32. The locking openings 32 are engageable by the securement devices 24 and 26 to achieve securement and automatic entry and release of the containers 22A and 22B.

Corner castings 28 may be of the type specified in the standards of the Association of American Railroads. In this case, additional locking openings (not shown) are formed in the vertically oriented corner casting walls adjacent the horizontal walls 30. The securement devices 24 and 26 of the present invention need not utilize locking openings in the vertical walls of the corner castings.

As best seen in FIGS. 2, 3, 7 and 8, each locking opening 32 is of a generally elongated or rectangular shape having a major axis generally parallel to the longest dimension of the container 22A or 22B. Each opening 32 is defined by a perimeter including two relatively long side walls 34 joined by two somewhat rounded relatively short end walls 36. The perimeter walls 34 and 36 of the openings 32 extend between the external and internal surfaces of the horizontal wall 30 of a corner casting 28. In order to effect securement of a container, the locking openings should be non-circular, and openings having different configurations may be used if desired.

The securement device 24 of the present invention is illustrated in more detail in FIGS. 3–11. Device 24 includes a base or housing 42 and a head 44 rotatable between locked and unlocked positions to effect securement or release of a cargo container 22A. In the illustrated arrangement, each device 24 is adapted to be permanently attached to the support 20 as by welding or fastening of the base 42. One device 24 is positioned in alignment with each of the four lower corner castings 28 of a container 22A.

In accordance with features of the present invention, the device 24 includes a spring assembly generally designated as 46 biasing the head 44 to the locked position, as well as a cam surface generally designated as 48 for rotating the head 44 as container 22A is raised or lowered. In addition, device 24 includes a positive locking lever 50 for preventing movement of head 44 from its locked position, and an indicator 52 providing a visible indication when the container 22A is secured in place.

Figure 4:
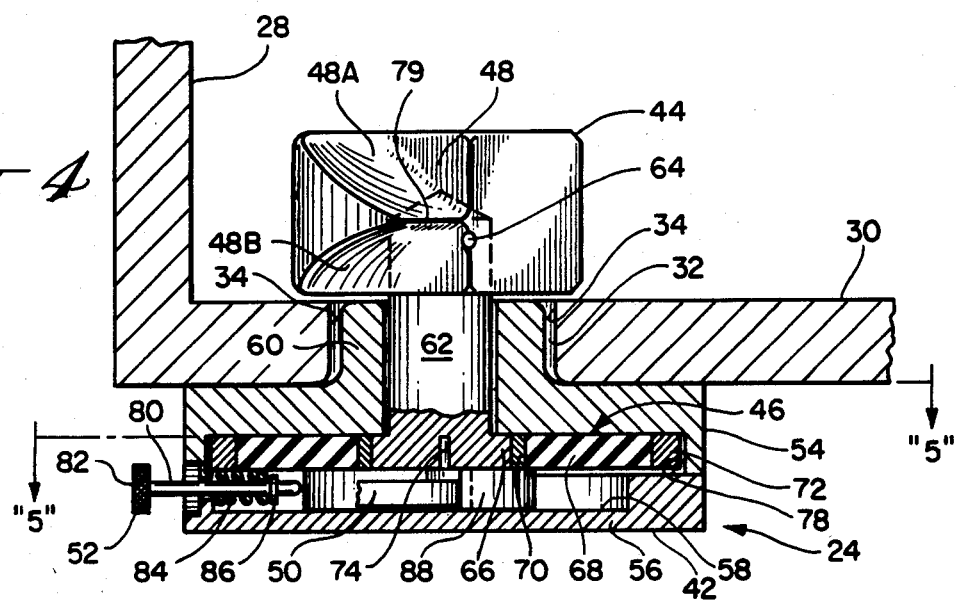
FIG. 4 is a sectional view illustrating the securement device and container of FIG. 3 with the container in secured position.
Figure 5:
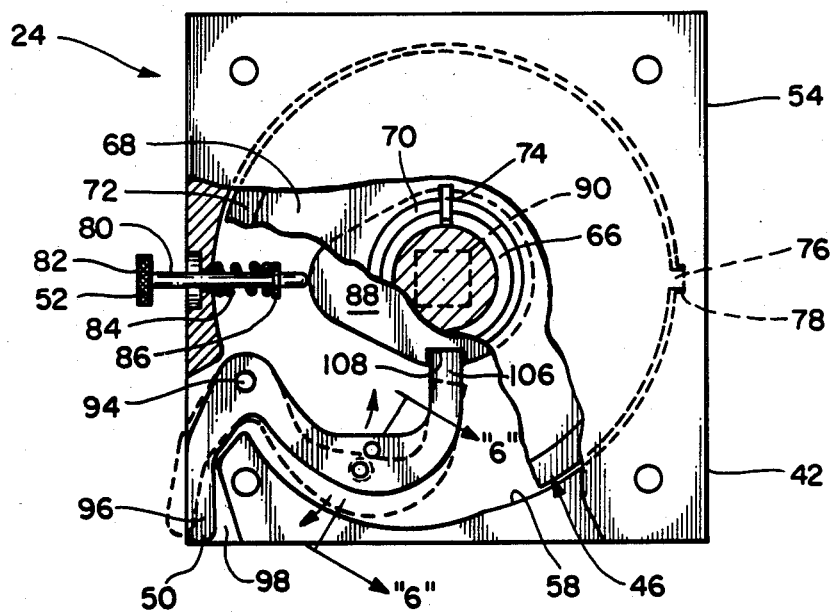
FIG. 5 is a plan view, with portions broken away, of the securement device of FIG. 4 and taken along the line 5—5 of FIG. 4.
Figure 7:
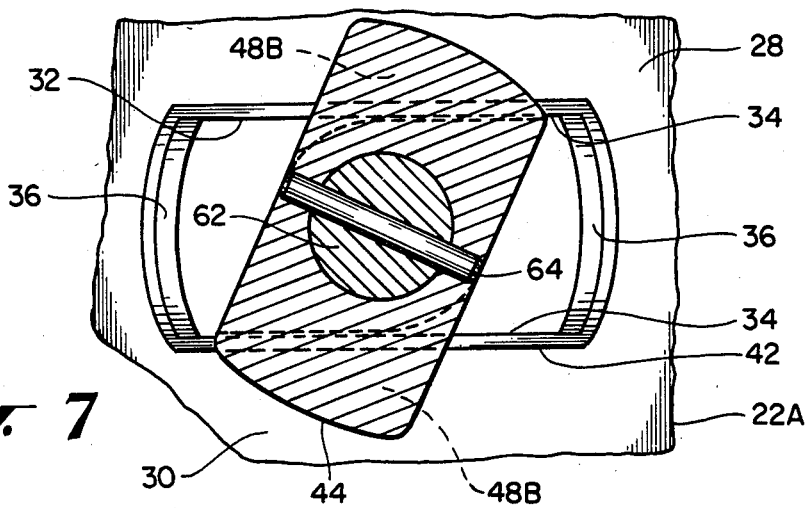
FIG. 7 is a fragmentary top view, partly in section, illustrating portions of the container and the securement device in the locked or secured position.

Base 24 includes upper and lower housing portions 54 and 56 secured together by suitable fasteners and defining an internal chamber or cavity 58. Upper housing portion 54 includes a projecting shear block or boss 60 having a shape similar to but slightly smaller than the locking opening 32. With the container 22A secured in the locked position as shown in FIGS. 4 and 7, the shear block 60 is received in opening 32 to prevent movement of container 22A in any horizontal direction.

A shaft 62 is journalled for rotation in an opening defined at the center of shear block 60. Head 44 is attached to an outwardly projecting portion of shaft 62 by means of a key 64 so that shaft 62 and head 44 rotate as a unit. Within chamber 58, shaft 62 includes an enlarged hub portion 66. Spring assembly 46 is connected between the hub 66 and the base 42 in order resiliently to hold the shaft 62 and head 44 in the locked position.

Spring assembly 46 includes an annular, disc-like body 68 of elastomeric and resilient material such as rubber. At its inner and outer peripheries respectively, the elastomeric body 68 is bonded or vulcanized to inner and outer rigid annular ring members 70 and 72. Inner ring 70 is fixed to hub 66 of shaft 62 by a pair of keys 74. Outer ring 72 includes a pair of projecting key portions 76 received in recesses 78 (FIGS. 4 and 5) provided in the upper housing member 54.

The inner periphery of the elastomeric spring assembly 46 is fixed with respect to shaft 62, while the outer periphery is fixed with respect to base 42. Spring assembly 46 consequently serves as a torsion spring biasing head 44 continually to its locked position. The spring force or spring constant is chosen to cooperate with cam surface 48 to provide a desired entry and exit force encountered when the container 22A is lowered onto or lifted off of support 20. The spring force or constant may be varied by selection of the configuration and characteristics of elastomeric material of body 68, as well as by providing suitable openings or apertures in the body 68.

Figure 8:
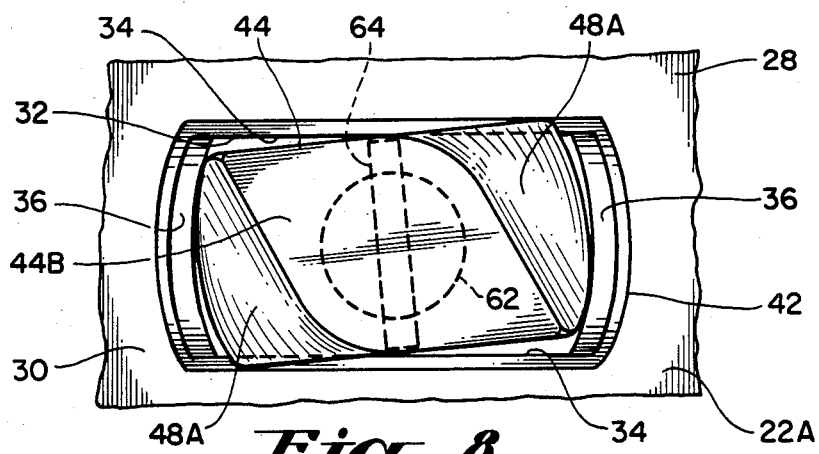
FIG. 8 is a view similar in some respects to FIG. 7 illustrating the components in the position assumed during loading of the container.

The head 44 as well as the cam surface 48 is generally symmetrical about its axis of rotation and the axis of shaft 62. As best seen in FIGS. 7 and 8, as viewed in the direction of this axis, the outline or shape of head 44 is similar to that of shear block 60 and of locking opening 32. In the locked position (FIG. 7) head 44 is not aligned with locking opening 32 and container 22A is secured in position because head 44 overlies portions of the corner casting horizontal wall 30. By interaction of cam surface 48 and the perimeter of locking opening 32, the head can be rotated to an unlocked or loading position (FIG. 8) in which the head can move relative to the container 22A through the locking opening 32.

Figure 9:
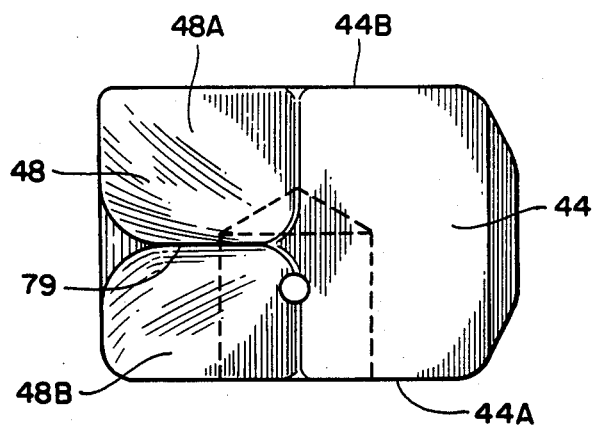
FIG. 9 is a side elevational view of the head of the device of FIGS. 3–8.
Figure 10:
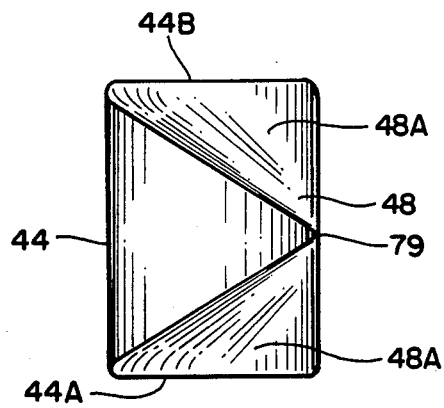
FIG. 10 is an end elevational view of the head of the device of FIGS. 3–8.
Figure 11:
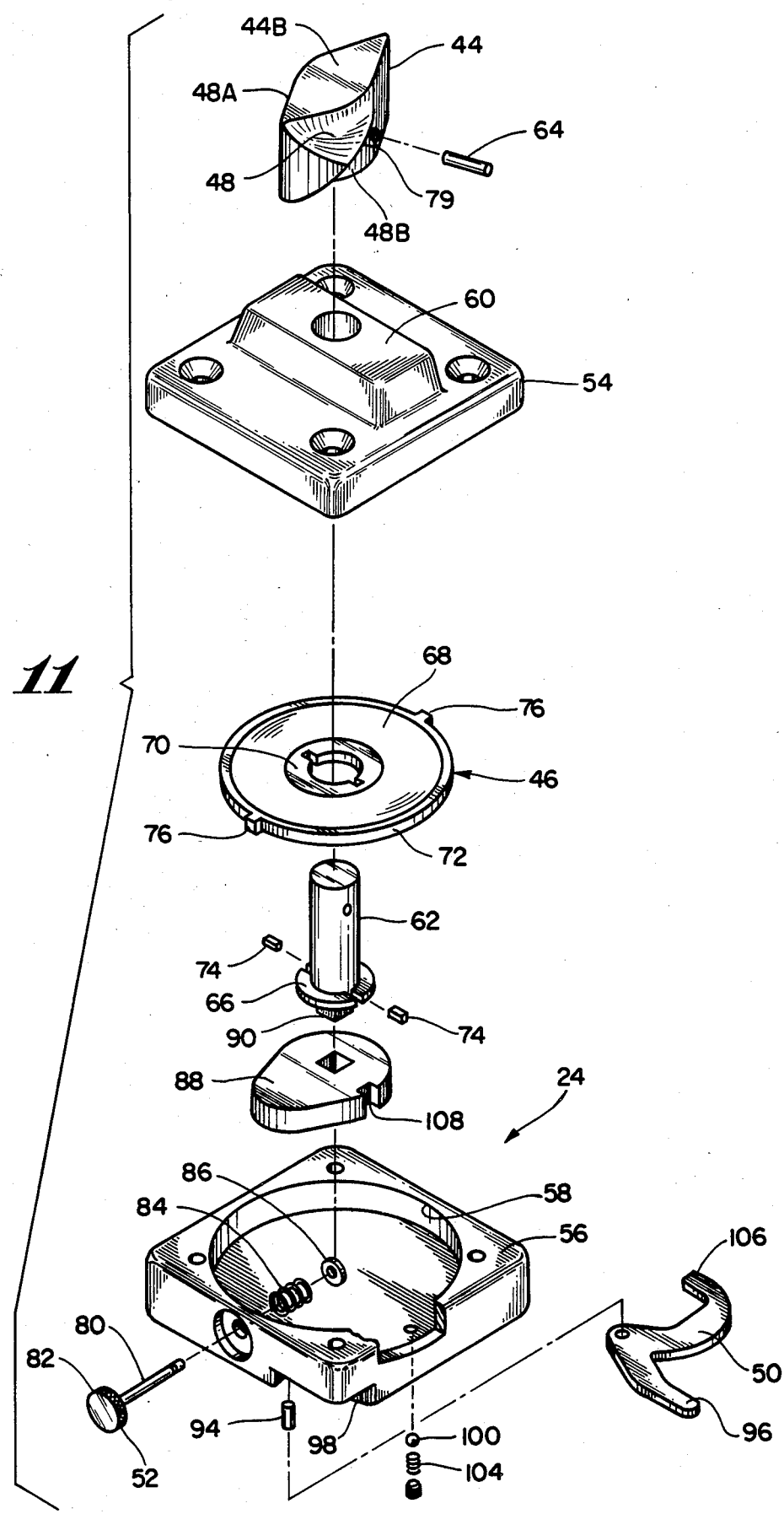
FIG. 11 is an exploded perspective view illustrating the components of the securement device of FIGS. 3–8.

Cam surface 48 includes a pair of similar and symmetrical entrance portions 48A directed generally away from base 42. Cam surface 48 also includes a pair of similar and symmetrical exit portions 48B directed generally toward the base 42. Cam portions 48A and 48B are shaped to interact with the perimeter of the locking opening 32 as the head 44 moves into or out of the corner casting 28. Furthermore, cam surfaces 48A and 48B are shaped somewhat differently from one another so that the force required for the head 44 to enter the locking opening 32 is smaller than the force required for the head 44 to exit from the locking opening 32. As best seen in FIGS. 9 and 10, the cam portions 48A and 48B meet at a horizontal plane designated by the reference character 79. Plane 79 is located closer to the inner end 44A of head 44 than to the outer end 44B. Thus the cam portion 48B is steeper than portion 48A.

Spring assembly 46 normally holds head 44 in the locked position illustrated, for example, in FIGS. 4 and 7. In this position, the head is angularly offset from the shear block 60 and cannot freely move through the locking opening 32. As a container 22A is lowered toward support 20, the perimeter of the locking opening 32 and specifically the edges of the side walls 34 engage the entrance cam portions 48A. As lowering of container 22A continues, the reaction between cam portions 48A and the opening 32 results in a torque applied around the axis of head 44 and shaft 62. This torque results in elastomeric deformation of spring 46 as head 44 rotates from the locked position (FIG. 7) toward the loading position (FIG. 8). As head 44 reaches the loading position, it is able to move through locking opening 32 and beyond wall 30 into the corner casting 28. As head 44 clears wall 30, spring assembly 46 returns the head to the locked position so that the container 22A is thereafter secured in place. The entry force required to rotate head 44 during loading of container 22A onto support surface 20 may, for example, be less than about 800 pounds.

When container 22A is removed from support 20, a substantially larger force is required due to the steeper configuration of the release cam portions 48B. More specifically, as container 22A is lifted, the perimeter of opening 62 engages cam portions 48B. The resultant force applies a torque about the axis of shaft 62 deforming spring assembly 46 and permitting head 44 to rotate from the locked position to the loading position of FIG. 8. Head 44 moves out of corner casting 28 through the locking opening 32 and beyond wall 30. Thereafter, spring assembly 46 returns the head to its locked position. The exit force required during lifting of container 22A from the support 20 may, for example, be in the range of 1600–2200 pounds.

Indicator 52 provides an indication visible from the exterior of the base 42 when the head 44 is in its locked position. Indicator 52 is an element having a shank 80 and head 82 movable between retracted and extended positions depending upon the angular position of head 44 and shaft 62. Indicator 52 is biased inwardly by means of a spring 84 (FIG. 5) held in compression between lower housing member 56 and a spring retainer 86 fixed to shank 80.

A cam member 88 is keyed to a lowermost extension 90 of shaft 62 for rotation therewith in cavity 58. When head 44 is in the locked position, the cam pushes shank 80 against the force of spring 84 so that the head 82 of the indicator 52 projects away from base 42 and is readily visible. In the unlocked position of head 44, the head portion 82 of indicator 52 is received in a countersunk recess of lower housing portion 56. Thus, the alternative locked or unlocked positions of head 44 can readily be determined.

In some instances it may be desirable to positively lock head 44 in the container secured position. For example device 24 may be used to secure to a rail car cargo containers containing hazardous materials. When such materials are transported, the use of a positive locking device assures that a container cannot be dislodged from a rail car even by extraordinary circumstances such as high winds or large forces.

Figure 6:
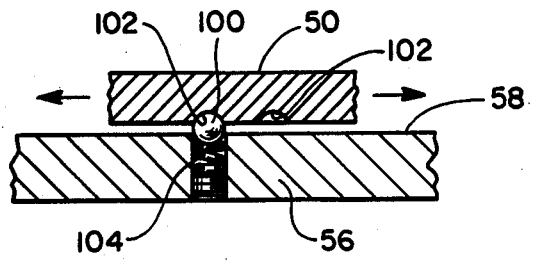
FIG. 6 is a fragmentary sectional view on an enlarged scale taken along the line 6—6 of FIG. 5.

Positive locking is achieved by the locking lever 50 mounted for pivotal movement within chamber 58 by a pivot pin 94. A handle portion 96 of lever 50 movable within a recess 98 defined in lower housing portion 56 is manipulated to move lever 50 between alternate locked and released positions. Lever 50 is detented in both of these positions by means of a detent ball 100 biased into recesses 102 on the underside of lever 50 by a spring 104 (FIG. 6). In the retracted position, locking lever 50 has no effect upon the movement of head 44. When the head 44 is in the locked position securing a container 22A in place, lever 50 can be moved to its alternate position in which a locking finger portion 106 enters a locking recess 108 defined in cam 88. In this position, forces applied by container 22A against the release cam surface portions 48B of head 44 cannot cause rotation of the head 44 from the locked position and the container 22A is consequently positively locked in place. Prior to release of container 22A, the locking lever 50 is withdrawn to its alternate position.

After the lower containers 22A have been secured to support 20, the upper containers 22B may be secured in stacked relationship by the securement devices 26 comprising an alternative embodiment of the present invention. Devices 26 are manually secured to corner castings 28 of the upper containers 22B and serve automatically to lock the containers in stacked relation above lower containers 22A.

Figure 12:
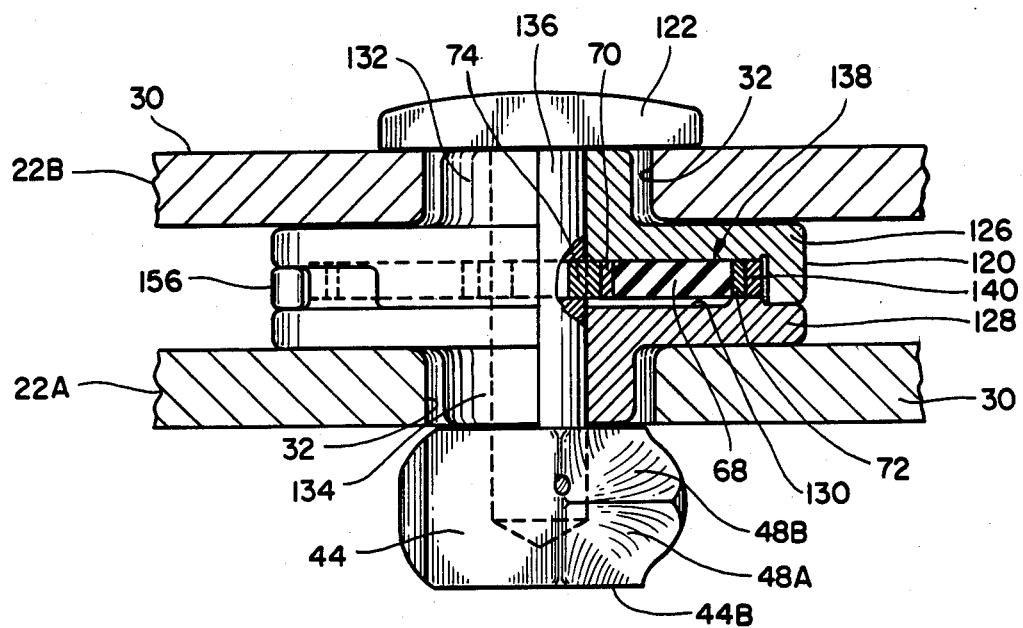
FIG. 12 is an elevational view, partly in section, of the other container securement device of FIG. 2 comprising an alternative embodiment of the present invention.

More specifically, and referring now to FIGS. 2 and 12-14, each device 26 includes a base or housing 120. At one side of the base 120 (the top as illustrated in the drawings) a manually operated locking head 122 is provided. When containers 22A and 22B are interlocked as illustrated in FIG. 12, head 122 secures device 26 to the locking opening 32 of the upper container 22B. Device 26 also includes a head 44 identical to that described above in connection with the device 24. Head 44 of device 26 serves automatically to secure container 22A to container 22B in stacked relationship. Reference may be had to the preceding description of device 24 for a complete description of head 44 and its operation during locking and unlocking of the securement device to container 22A.

Base 120 includes upper and lower housing portions 126 and 128 secured together by fasteners to define an internal chamber or cavity 130. Housing portions 126 and 128 each include a projecting, bosslike shear blocks 132 and 134. The shear blocks are similar in shape to locking openings 32 of the upper and lower containers 22B and 22A. When the containers are secured by device 26, the shear blocks 132 and 134 enter these openings and prevent movement of the containers in any horizontal direction and prevent any rotation of the device 26 relative to the containers.

A shaft 136 extends through the base 120 and is mounted for rotation in openings provided in shear blocks 132 and 134. The manually operable head 122 may be integral with or secured to one end of shaft 136. Head 44 is attached to the opposite end of shaft 136, and heads 122 and 44 rotate as a unit together with shaft 136.

A spring assembly 138 biases shaft 136 as well as heads 122 and 44 to a normally locked position. Spring assembly 138 may be similar or identical to spring assembly 46 and includes an elastomeric body 68, an inner ring 70 and an outer ring 72. Inner ring is fixed by keys 74 to shaft 136, and outer ring 72 is keyed by projections 76 to a ring member 140. If desired, the outer ring 72 of spring assembly 138 and the ring 140 may be replaced with a single ring member.

Normally ring member 140 is fixed with respect to base 120 and head 44 can only be moved from its locked position by deformation of spring assembly 138. In accordance with a feature of the invention, a release lever 142 may be actuated to free the ring member 140 from base 120 in order to permit manual locking of head 122 to the locking opening 32 of an upper container 22B.

Figure 13:
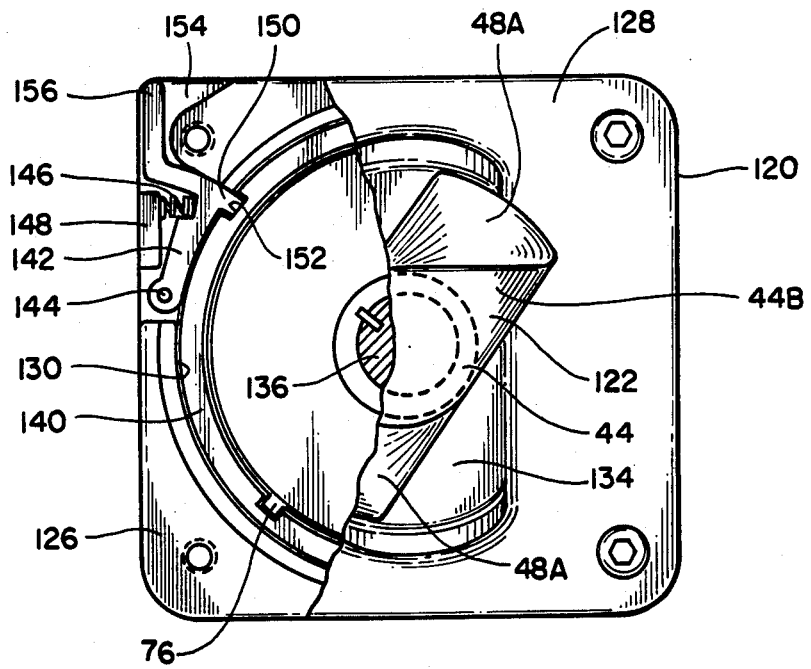
FIG. 13 is a bottom view, partly in section, of the securement device of FIG. 12.

Release lever 142 is pivoted with respect to base 120 by a pivot pin 144. A spring 146 held in compression between lever 142 and an abutment portion 148 of the upper housing section 126 continuously biases lever 142 toward ring 140. When a latch projection 150 of lever 142 enters a notch 152 in ring 140 as illustrated in FIG. 13, the outer periphery of the spring assembly 138 is fixed with respect to base 120. Lever 142 is received in a recess 154 of housing portion 126 and includes a handle 156 which can be manipulated from the exterior of base 120 in order to release the ring 140 thereby to free the heads 122 and 44 and the shaft 136 for free rotation.

To install the securement device 26 between stacked containers 22A and 22B, the lowermost container 22A is first secured in place by device 24. Then the upper container 22B is lifted to a convenient height and devices 26 are secured to the locking openings 32 of the corner castings 28 of the container 22B.

More specifically, the manually operable head 122 normally is positioned generally perpendicular to the shear block 132. To install device 26 to an upper container, lever 142 is operated to release the spring assembly 138 for free rotation. In this condition, the head 122 can easily be rotated into alignment with shear block 132 and, in this aligned position, the head 122 and shear block 132 can be lifted into and through a locking opening 32. Once in position, the head 122 and shaft 136 are rotated by turning the accessible head 44 until the latch projection 50 of lever 142 engages the notch 152 thus fixing the outer periphery of the spring assembly 138. In this position, the head 122 is offset with respect to the long dimension of the locking opening 32 so that the device 26 is secured to the corner casting 28 of the upper container 22B.

Securement of the stacked assembly is then completed by lowering the upper container 22B down onto the lower container 22A. In the manner described above in connection with device 24, the head 44 of each device 28 moves through locking opening 32 of the upper corner castings 28 of the lower containers 22A. Since spring assembly 138 is fixed with respect to the base 120, the cam surface 48 of head 44 cooperates with spring assembly 138 to provide entry and release forces in the manner described above.

Figure 14:
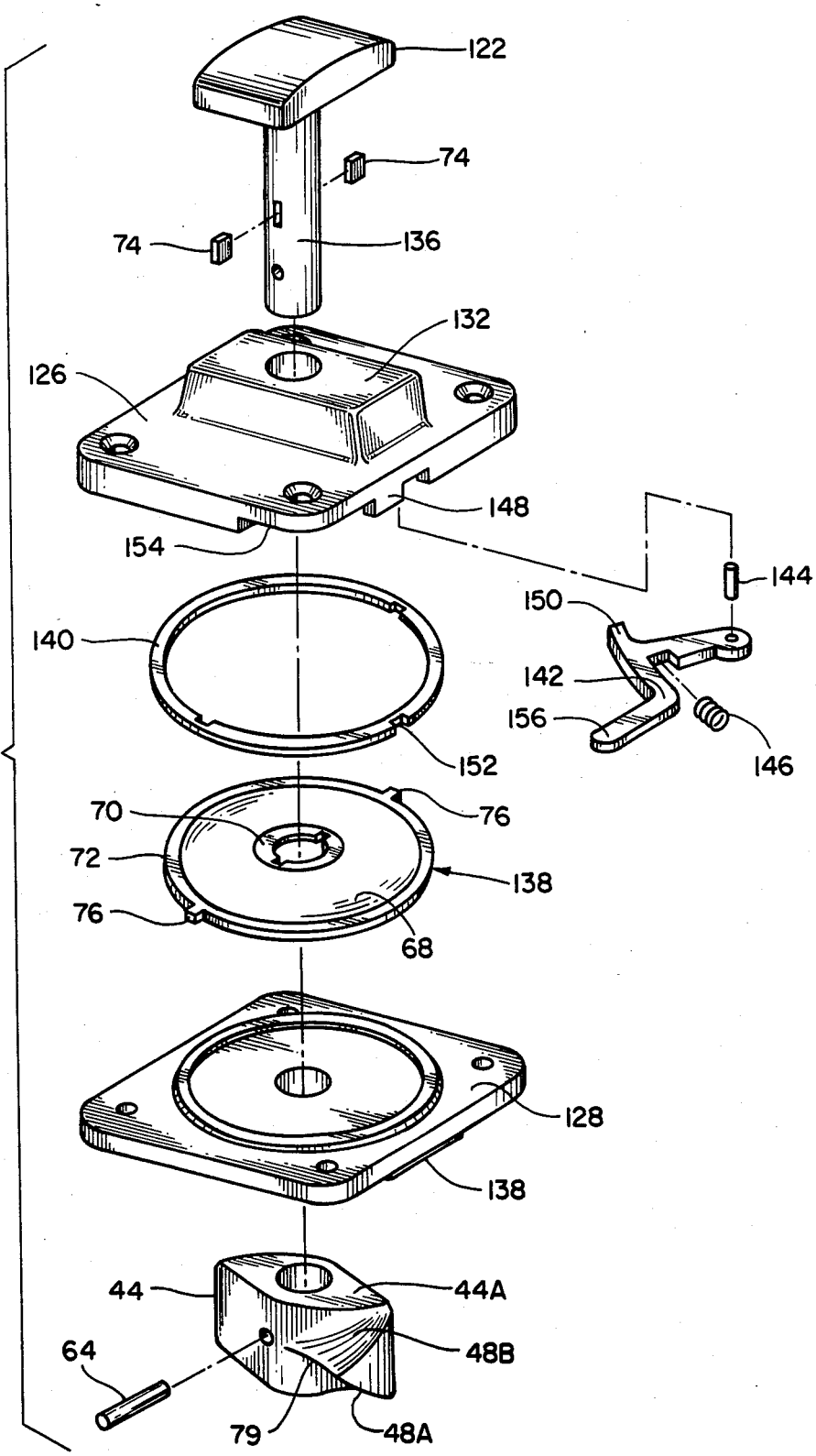
FIG. 14 is an exploded perspective view illustrating the components of the securement device of FIGS. 12 and 13.

As head 44 rotates relative to the securement device 26, the shaft 136 and the head 122 also rotate. Heads 122 and 44 are angularly offset with respect to one another as indicated in FIG. 14 so that when head 44 reaches the unlocked position, head 122 remains in a locked position with respect to the upper container 22B. Although head 122 rotates as head 44 moves from the locked position to the unlocked position and back to the locked position, head 122 never reaches an unlocked position at any point through the range of movement of head 44.

If desired, a visible indicator similar to the indicator 52 of device 24 may be incorporated in the device 26. Similarly, if desired, the positive locking feature including a positive locking lever such as lever 50 described above may be employed.

While the invention has been described with reference to details of the illustrated embodiment, it should be understood that such details are not intended to limit the scope of the present invention as defined in the appended claims.

What is claims and desired to be secured by Letters Patent of the United States is:

1. A container securement device for securing a container in a secured position adjacent a support, said container having a noncircular locking opening, said device comprising in combination:
   a base adapted to be secured to the support;
   a shaft supported by said base for rotation around an axis extending through the locking opening as the container is secured;
   a head carried by said shaft and adapted to move relative to said container through said opening;
   said head having a shape permitting said head to move through said locking opening in an unlocked rotational position of said head and preventing movement of said head through said opening in a rotationally offset locked position of said head;
   a spring connected between said shaft and said base biasing said head toward said locked position and permitting said head to rotate to said unlocked position in response to an application of torque to said shaft; and
   actuating means engagable by said container upon relative movement of said container and said base for applying torque to said shaft for moving said head to said unlocked position and permitting movement of said head through said locking opening;
   said actuating means releasing said shaft for return to said locked position upon complete movement of said head through said locking opening.

2. A container securement device as claimed in claim 1 wherein said actuating means includes cam means carried by said shaft.

3. A container securement device as claimed in claim 2, said cam means comprising a cam surface defined on said head engagable with the perimeter of said locking opening.

4. A container securement device as claimed in claim 1, said base including a shear block having a shape similar to the locking opening, said shear block being received in said locking opening when said container is secured adjacent the support.

5. A container securement device as claimed in claim 1, further comprising means for selectively releasing said spring from said base to permit free movement of said head and shaft about said axis.

6. A container securement device as claimed in claim 1, further comprising an indicator visible from the exterior of said base, and means connected between said shaft and said indicator for moving said indicator in response to rotational movement of said head.

7. A container securement device as claimed in claim 1, further comprising manually operable lock means engagable between said base and said shaft for positively locking said shaft with said head in said locked position.

8. A container securement device as claimed in claim 1, further comprising a cam member carried by said shaft within said base, an indicator visible from the exterior of said base, said indicator being engagable with said cam for moving said indicator in response to rotational movement of said head, and manually operable lock means supported by said base and engagable with said cam for positively locking said shaft with said head in said locked position.

9. A securement device as claimed in claim 1 wherein said spring is a torsion spring attached between said base and said shaft within said base.

10. A securement device as claimed in claim 9 wherein said spring includes an elastomeric disk shaped element.

11. A securement device as claimed in claim 1 wherein said support is a vehicle deck and said base is adapted to be permanently affixed to the support.

12. A securement device as claimed in claim 1 wherein said base is adapted to be affixed to an additional container in stacked relationship with the container to be secured.

13. A container securement device of the type including a base, a shear block projecting from said base adapted to engage a locking opening in a container placed against the base, a rotatable head movable between a container loading position generally aligned with said shear block in which the head and shear block can enter the locking opening and a container locked position offset from the shear block in which the container is secured against the base, and the improvement comprising:
 a spring connected between said base and said head biasing said head to said container locked position;
 and a cam surface on said head for rotating said head in opposition to the force of said spring in response to engagement of said cam surface with the perimeter of said locking opening.

14. A container securement device as claimed in claim 13, said base including a second shear block for engaging the locking opening of a second container in stacked relation with the container to be secured, and a second head movable relative to said second shear block for locking and releasing the device with respect to the second container.

15. A container securement device as claimed in claim 14, said second head being manually movable between locked and released positions.

16. A container securement device as claimed in claim 15 further comprising a shaft extending through said base and connected to both said heads, said spring being connected between said base and said shaft, and means for selectively releasing said spring from said base to permit manual movement of the second head.

17. A container securement device as claimed in claim 16, said heads being angularly offset so that the container locked positions of the heads are angularly offset.

18. A container securement device as claimed in claim 13, further comprising means for selectively releasing said spring to permit free movement of said head.

19. A container securement device as claimed in claim 13, further comprising lock means for positively locking said head in said container locked position.

20. A container securement device as claimed in claim 13, further comprising indicator means visible from outside said base for indicating the position of said head.

21. A container securement device as claimed in claim 13, said cam surface including first and second portions for rotating said head respectively upon movement of said head into and out of said locking opening.

22. A container securement device as claimed in claim 21, said cam surface portions being shaped to define an entry force during movement of said head into said locking opening smaller than the exit force during movement of said head out of said locking opening.

* * * * *